United States Patent
Duffy et al.

(10) Patent No.: US 11,991,305 B2
(45) Date of Patent: May 21, 2024

(54) RENDERING MESSAGES IN RESPONSE TO USER-OBJECT INTERACTION

(71) Applicant: Nokia Technologies Oy, Espoo (FI)

(72) Inventors: David Duffy, Zurich (CH); Timothy Beard, Cambridge (GB); Matthew Lawrenson, Chesterfield, MO (US)

(73) Assignee: Nokia Technologies Oy, Espoo (FI)

( * ) Notice: Subject to any disclaimer, the term of this patent is extended or adjusted under 35 U.S.C. 154(b) by 434 days.

(21) Appl. No.: 17/418,110

(22) PCT Filed: Jan. 17, 2020

(86) PCT No.: PCT/EP2020/051197
§ 371 (c)(1),
(2) Date: Jun. 24, 2021

(87) PCT Pub. No.: WO2020/152064
PCT Pub. Date: Jul. 30, 2020

(65) Prior Publication Data
US 2022/0070289 A1    Mar. 3, 2022

(30) Foreign Application Priority Data
Jan. 21, 2019   (EP) .................................. 19152907

(51) Int. Cl.
*H04M 1/7243*  (2021.01)
*H04L 51/046*  (2022.01)
(Continued)

(52) U.S. Cl.
CPC ........ *H04M 1/7243* (2021.01); *H04L 51/046* (2013.01); *H04L 51/08* (2013.01); *H04L 51/10* (2013.01); *H04M 1/72454* (2021.01)

(58) Field of Classification Search
CPC ............ H04M 1/7243; H04M 1/72454; H04L 51/046; H04L 51/08; H04L 51/10;
(Continued)

(56) References Cited

U.S. PATENT DOCUMENTS

| | | |
|---|---|---|
| 2008/0096532 A1 | 4/2008 | Lyle et al. |
| 2009/0176526 A1 | 7/2009 | Altman |

(Continued)

FOREIGN PATENT DOCUMENTS

WO    2018/175257 A1    9/2018

OTHER PUBLICATIONS

Office action received for corresponding European Patent Application No. 19152907.2, dated Dec. 20, 2021, 7 pages.

(Continued)

*Primary Examiner* — Kabir A Timory
(74) *Attorney, Agent, or Firm* — Harrington & Smith

(57) ABSTRACT

An apparatus comprising means for, a method comprising, and a computer program that performs: preventing rendering, via the apparatus, of a message received at the apparatus; determining an association between the received message and an external, real object; and enabling rendering of the message via the apparatus in response to a change from a first physical relationship between a user and the external, real object to a second physical relationship between the user and the external, real object.

19 Claims, 11 Drawing Sheets

(51) Int. Cl.
*H04L 51/08* (2022.01)
*H04L 51/10* (2022.01)
*H04M 1/72454* (2021.01)

(58) Field of Classification Search
CPC ...... G06F 8/38; G06F 3/017; G06F 2203/011; G06F 3/011
See application file for complete search history.

(56) References Cited

U.S. PATENT DOCUMENTS

| | | |
|---|---|---|
| 2012/0323087 A1 | 12/2012 | Leon Villeda et al. |
| 2012/0326853 A1 | 12/2012 | Reponen et al. |
| 2013/0246524 A1 | 9/2013 | Berner et al. |
| 2016/0179199 A1 | 6/2016 | Levesque et al. |
| 2016/0321243 A1 | 11/2016 | Walia et al. |
| 2017/0090582 A1* | 3/2017 | Ganesan ............... G06F 40/177 |

OTHER PUBLICATIONS

"A Smart Phone that Knows You're Angry", MIT Technology Review, Retrieved on Jun. 23, 2021, Webpage available at : https://www.technologyreview.com/2012/01/09/188503/a-smart-phone-that-knows-youre-angry/.

"Let's touch: why physical connection between human beings matters", The Guardian, Retrieved on Jun. 24, 2021, Webpage available at : https://www.theguardian.com/society/2018/jan/03/lets-touch-why-physical-connection-between-human-beings-matters.

Erp et al., "Social touch in human-computer interaction", Frontiers in Digital humanities, vol. 2, Article 2, May 2015, pp. 1-14.

"Exposure to Heat Can Improve Mental Well-Being", Psychology Today, Retrieved on Jun. 24, 2021, Webpage available at : https://www.psychologytoday.com/gb/blog/the-stress-proof-life/201712/exposure-heat-can-improve-mental-well-being.

Obrist et al., "Emotions Mediated Through Mid-Air Haptics", Proceedings of the 33rd Annual ACM Conference on Human Factors in Computing Systems, Apr. 2015, pp. 2053-2062.

"When Cooler Heads Prevail", Psychological Science, Retrieved on Jun. 24, 2021, Webpage available at : https://www.psychologicalscience.org/publications/observer/obsonline/when-cooler-heads-prevail.html.

"Google just showed off an incredible camera app that identifies real-world objects", Business Insider, Retrieved on Jun. 24, 2021, Webpage available at : https://www.businessinsider.com/google-io-lens-camera-app-augmented-reality-identifies-objects-2017-5?r=US&IR=T.

Pradhan et al., "Smartphone-based Acoustic Indoor Space Mapping", Proceedings of the ACM on Interactive, Mobile, Wearable and Ubiquitous Technologies, vol. 2, No. 2, Jun. 2018, 26 pages.

"Automatically detecting emotion from text", Tech Xplore, Retrieved on Jun. 24, 2021, Webpage available at : https://techxplore.com/news/2017-05-automatically-emotion-text.html.

"Apple's iPhone X proves it: Silicon Valley is getting emotional", Computer World., Retrieved on Jun. 24, 2021, Webpage available at : https://www.computerworld.com/article/3235424/apples-iphone-x-proves-it-silicon-valley-is-getting-emotional.html.

"Emotibot wants to help chatbots know how you really feel", Tech Crunch., Retrieved on Jun. 24, 2021, Webpage available at : https://techcrunch.com/2016/12/02/emotibot-wants-to-help-chatbots-know-how-you-really-feel/?ncid=rss.

Bargh et al., "The substitutability of physical and social warmth in daily life", Emotion, vol. 12, No. 1, 2012, pp. 1-15.

Williams et al., "Experiencing Physical Warmth Promotes Interpersonal Warmth", Science, vol. 322, No. 5901, Oct. 24, 2008, pp. 1-5.

Halali et al., "Keep it cool: temperature priming effect on cognitive control", Psychological Research, vol. 81, No. 2, 2017, pp. 343-354.

"Cognitive Control", Nature Portfolio, Retrieved on Jun. 24, 2021, Webpage available at : https://www.nature.com/subjects/cognitive-control.

Extended European Search Report received for corresponding European Patent Application No. 19152907.2, dated Apr. 23, 2019, 8 pages.

International Search Report and Written Opinion received for corresponding Patent Cooperation Treaty Application No. PCT/EP2020/051197, dated Feb. 6, 2020, 12 pages.

* cited by examiner

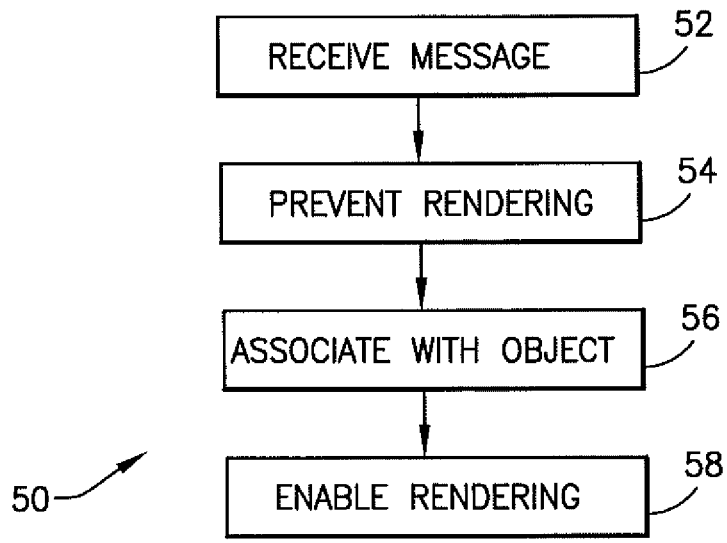
FIG.13
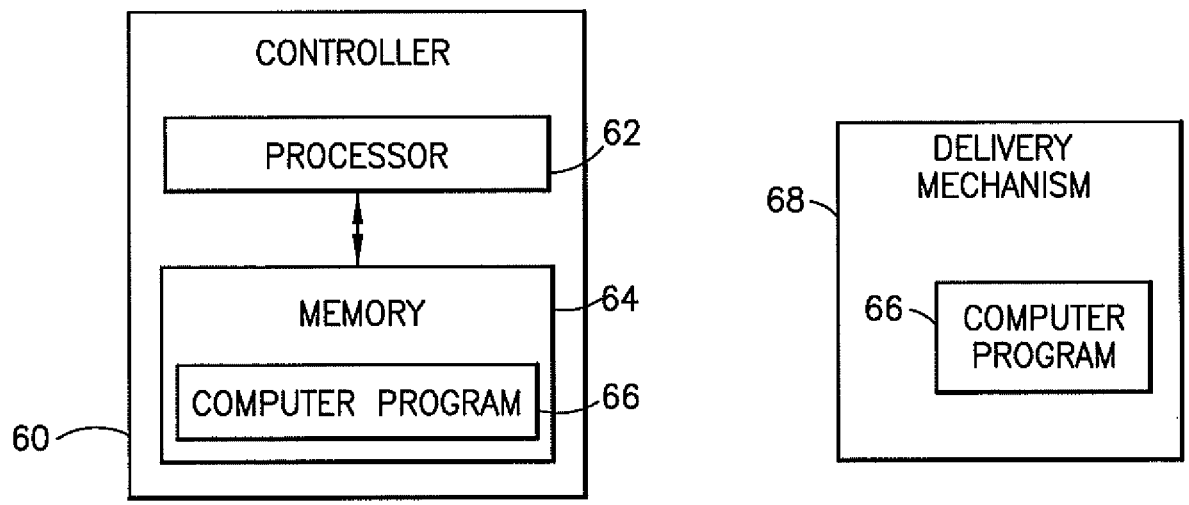
FIG.14A
FIG.14B
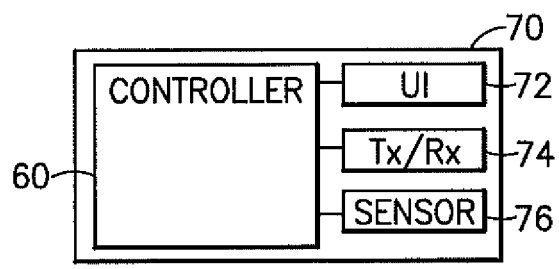
FIG.15

RENDERING MESSAGES IN RESPONSE TO USER-OBJECT INTERACTION

RELATED APPLICATION

This application claims priority to PCT Application No. PCT/EP2020/051197, filed on Jan. 17, 2020, which claims priority to European Application No. 19152907.2, filed on Jan. 21, 2019, each of which is incorporated herein by reference in its entirety.

TECHNOLOGICAL FIELD

Embodiments of the present disclosure relate to rendering messages in response to user-object interaction. Some relate to rendering messages via electronic communications devices in response to user interaction with an object external to the electronic communications device.

BACKGROUND

Electronic communications devices may presently lack the capabilities to replicate some physiological effects experienced during in-person communication. For example, they may not be able to replicate the warmth of a touch or a scent. Such effects are social cues that may affect a person's understanding of the communication.

BRIEF SUMMARY

According to various, but not necessarily all, embodiments there is provided an apparatus comprising means for: receiving a message at the apparatus; preventing rendering of the message via the apparatus; determining an association between the received message and an external, real object; and enabling rendering of the message via the apparatus in response to a change from a first physical relationship between a user and the external, real object to a second physical relationship between the user and the external, real object.

According to various, but not necessarily all, embodiments there is provided a method comprising: receiving a message at an apparatus; preventing rendering of the message via the apparatus; determining an association between the received message and an external, real object; and enabling rendering of the message via the apparatus in response to a change from a first physical relationship between a user and the external, real object to a second physical relationship between the user and the external, real object.

According to various, but not necessarily all, embodiments there is provided a computer program that, when run on a computer, performs: preventing rendering, via an apparatus, of a message received at the apparatus; determining an association between the received message and an external, real object; and enabling rendering of the message via the apparatus in response to a change from a first physical relationship between a user and the external, real object to a second physical relationship between the user and the external, real object.

According to various, but not necessarily all, embodiments there is provided an apparatus which comprises at least one processor and at least one memory, including computer program code. The at least one memory and the computer program code are configured to, with the at least one processor, cause the apparatus at least to perform: preventing rendering, via the apparatus, of a message received at the apparatus; determining an association between the received message and an external, real object; and enabling rendering of the message via the apparatus in response to a change from a first physical relationship between a user and the external, real object to a second physical relationship between the user and the external, real object.

According to various, but not necessarily all, embodiments there is provided a non-transitory computer readable medium comprising program instructions for causing an apparatus to perform at least the following: preventing rendering, via the apparatus, of a message received at the apparatus; determining an association between the received message and an external, real object; and enabling rendering of the message via the apparatus in response to a change from a first physical relationship between a user and the external, real object to a second physical relationship between the user and the external, real object.

According to various, but not necessarily all, embodiments there is provided a non-transitory computer readable medium comprising program instructions stored thereon for performing at least the following: preventing rendering, via an apparatus, of a message received at the apparatus; determining an association between the received message and an external, real object; and enabling rendering of the message via the apparatus in response to a change from a first physical relationship between a user and the external, real object to a second physical relationship between the user and the external, real object.

According to various, but not necessarily all, embodiments there is provided examples as claimed in the appended claims.

The following portion of this "Brief Summary" section, describes various features that may be features of any of the embodiments described in the foregoing portion of the "Brief Summary" section. The description of a function should additionally be considered to also disclose any means suitable for performing that function The external, real object may be movable.

The message may be composed at a different apparatus by a user of the different apparatus.

Preventing rendering of the message may comprise storing the message, for example at the apparatus, instead of rendering the message to the user.

Preventing rendering of the message may be conditional upon a classification of received message.

Determining an association between the received message and the external, real object may comprise: analysis of the received message to define one or more object properties; and selection of an external, real object having at least one of the one or more object properties.

The one or more object properties may comprise physical properties of the external, real objects.

In some examples, analysis of an external environment is caused so as to identify one or more external, real objects and one or more corresponding object properties.

The rendering of the message may be enabled in response to a predefined change in a physical relationship between the user and the external, real object.

The rendering of the message may be enabled in response to a change to a predefined second physical relationship.

The change from the first physical relationship to the second physical relationship may comprise a change in at least a relative position of the user with respect to the external, real object.

The change from the first physical relationship to the second physical relationship may comprise a change in at least an orientation of the user with respect to a bearing between the user and the external, real object.

Enabling rendering of the message may be conditional upon maintenance of the second physical relationship for a predefined period of time.

In some examples, a prompt is caused to be rendered via the apparatus, wherein the prompt directs the user to perform the change to the second physical relationship.

The apparatus may be an electronic communications device comprising one or more user interfaces and a transceiver for receiving messages.

BRIEF DESCRIPTION

Some example embodiments will now be described with reference to the accompanying drawings in which:

FIG. 1 schematically illustrates an example of the apparatus as described herein;

FIG. 2 schematically illustrates an example of a message received by the apparatus as described herein;

FIG. 3 schematically illustrates an example of classifying the message as described herein;

FIGS. 4A and 4B schematically illustrate examples of responses of the apparatus to two different messages as described herein;

FIG. 5 schematically illustrates an example of an association between the message and an object as described herein;

FIG. 6 schematically illustrates an example of analyzing an external environment as described herein;

FIGS. 7A, 7B, 8A, and 8B schematically illustrate examples of changes in a physical relationship between a user and the object as described herein;

FIG. 9 schematically illustrates an example of a parameter space as described herein;

FIGS. 10 and 11 schematically illustrate examples of parameters which define the parameter space as described herein;

FIG. 12 schematically illustrates an example of a prompt rendered to the user as described herein;

FIG. 13 shows an example of a method as described herein.

FIG. 14A shows an example of a controller as described herein;

FIG. 14B shows an example of a delivery mechanism as described herein; and

FIG. 15 shows an example of an electronic communications device as described herein.

DETAILED DESCRIPTION

Figure 1:
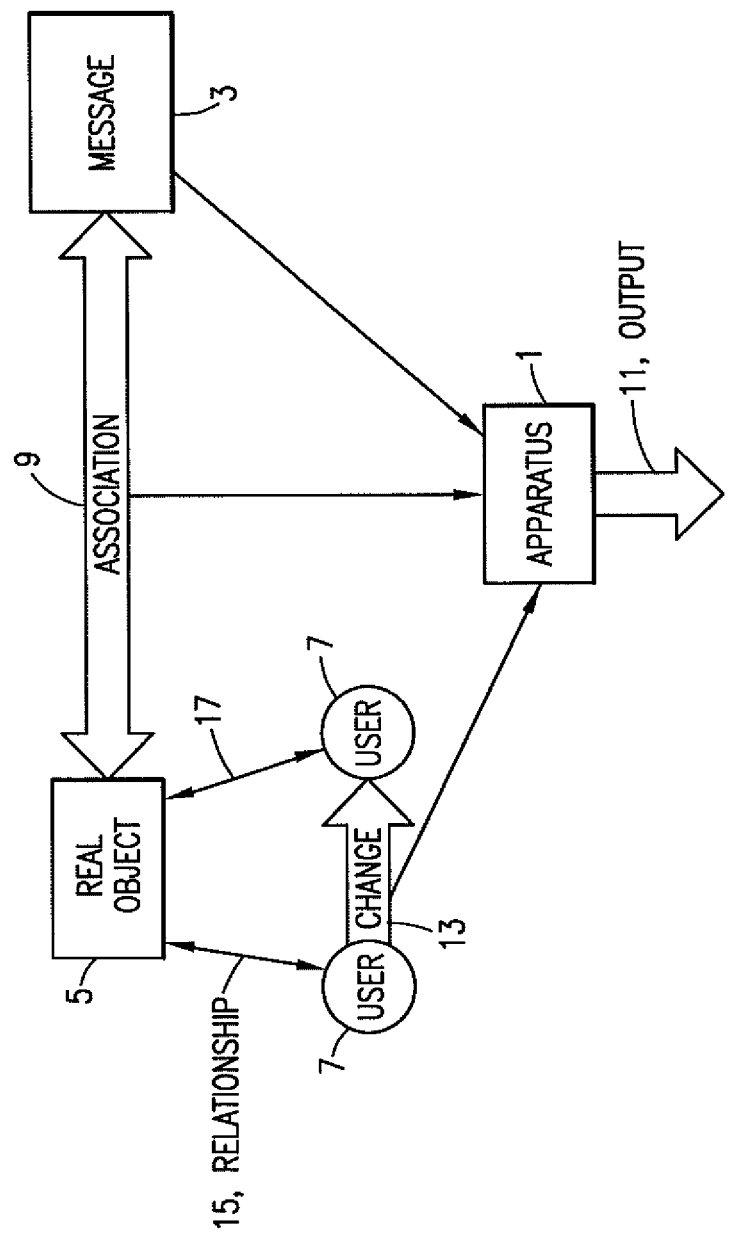

FIG. 1 schematically illustrates an example of an apparatus 1.

The apparatus 1 receives a message 3. The message 3 received at the apparatus 1 may comprise content to be rendered to a user 7.

The apparatus 1 prevents rendering of the message 3 via the apparatus 1. In some examples preventing rendering of the message 3 comprises storing the message 3 at the apparatus 1 instead of rendering the message 3 to the user 7.

The apparatus 1 determines an association 9 between the received message 3 and an external, real (as opposed to virtual) object 5. The use of the term "external" in respect of the real object 5 refers to the real object 5 being external to the apparatus 1. The external, real object 5 exists outside of the apparatus 1. In some examples the external, real object 5 is not connected, via circuitry, to the apparatus 1. In some examples the external, real object 5 is not connected, via a network, to the apparatus 1. The external, real object 5 may be a movable object.

The apparatus 1 enables rendering of the message 3 via the apparatus 1 (as shown by output 11 in FIG. 1) in response to a change 13 from a first physical relationship 15 between the user 7 and the external, real object 5 to a second physical relationship 17 between the user 7 and the external, real object 5. For the avoidance of doubt, the second physical relationship 17 is different to the first physical relationship 15.

In some examples rendering the message 3 via the apparatus 1 comprises rendering the message 3 at the apparatus 1, for example, at a user interface of the apparatus 1. In other examples rendering the message 3 via the apparatus 1 comprises rendering the message 3 at a device connected, via circuitry or via a network, to the apparatus 1. The message 3 may be rendered via the apparatus 1 at a networked or connected device which is distinct from the external, real object 5.

The change 13 in the physical relationship between the user 7 and the external, real object 5 is indicative of the user 7 interacting with the external, real object 5. This is described in greater detail with respect to FIGS. 7A through 11 below.

In some examples the apparatus determines the change 13 in the physical relationship between the user 7 and the external, real object 5. The apparatus 1 may determine this change 13 based on processing of signals received from sensors for monitoring the user 7, the external, real object 5, and/or the physical relationship therebetween. In some examples the apparatus 1 detects this change 13. For example, the apparatus 1 may comprise sensors for monitoring the user 7, the external, real object 5 and/or the physical relationship therebetween.

The sensors for monitoring the user 7, the external, real object 5 and/or the physical relationship therebetween may comprise: video cameras such as on a laptop, tablet, or smart glasses; a microphone such as on a mobile phone or on a smart home assistant device; an accelerometer such as on a wearable device, for example a smart watch; etc.

The apparatus 1 may have access to a database of characteristic acoustic signals indicative of user interaction with different objects. Thus, a microphone can be used to determine user interactions. The acoustic signals indicative of user interaction with different objects can be learnt by using detected acoustic signals when it is known that the user 7 is interacting with a known object.

The apparatus 1 may have access to a database of characteristic gestures indicative of user interaction with different objects. Thus, an accelerometer on, for example, a smart watch can be used to determine user interactions. The gestures indicative of user interaction with different objects can be learnt by using detected accelerometer data when it is known that the user 7 is interacting with a known object.

Figure 2:
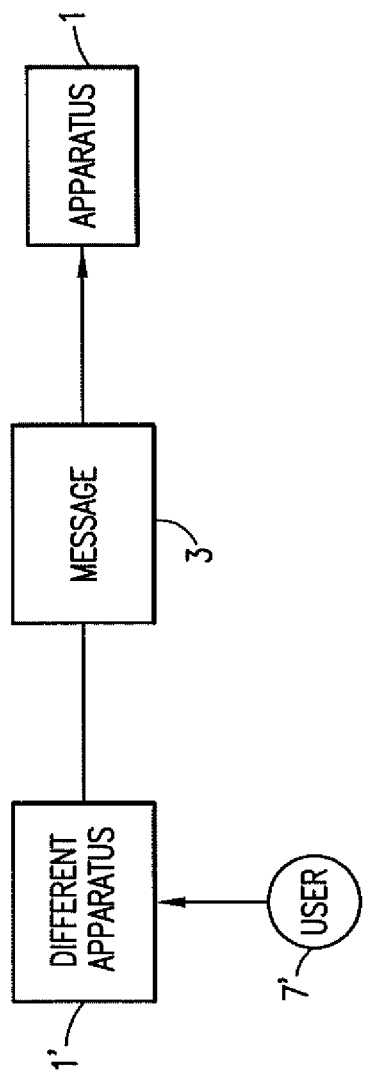

In some examples the message 3 received at the apparatus 1 is composed at a different apparatus 1' by a user 7' of the different apparatus 1' as schematically illustrated in FIG. 2. Alternatively, the message 3 may be composed by the user 7 at the apparatus 1. In this example, the message 3 may be a reminder set by the user 7 which is released to the user 7 when the user 7 interacts with an external, real object 5 associated with the reminder.

Figure 3:
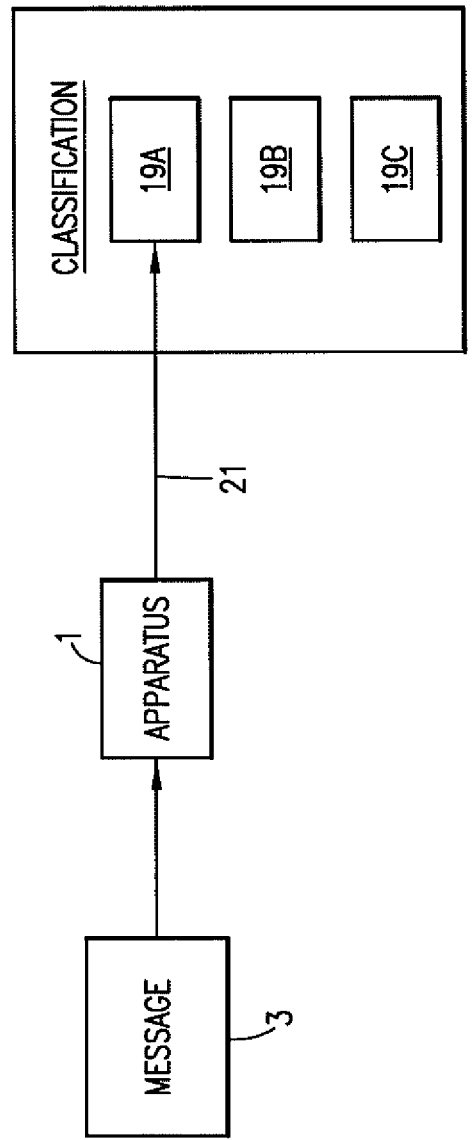

Upon receipt of the message 3 at the apparatus 1, the received message 3 is classified 21 into one of a plurality of different clarifications 19A to C as schematically illustrated in FIG. 3. Although FIG. 3 only illustrates three distinct classifications 19A to C, it is to be appreciated that there may be more than three different classifications. In some examples there may only be two classifications.

Classifying 21 the received message 3 comprises analysis of the message 3. The classification 19A to C of the received message 3 is determined from analysis of the content and/or context of the message 3. The content of the message 3 may be analyzed using, for example, natural language processing algorithms. The context of the message 3 may be analyzed by processing metadata, for example metadata which tags the message 3 with a particular classification 19A to C. The metadata may also comprise information about the composer of the message 3.

In some examples preventing rendering of the message 3 is conditional upon the classification 19A to C of the received message 3. For example, the classification 19A to C may reflect the urgency status of the message 3. Messages having the highest urgency status may be rendered via the apparatus 1 regardless of any current physical relationship between the user 7 and any external, real object 5.

In examples where the received message 3 does not have a classification 19A to C which warrants the initial prevention of rendering to be overridden, or in examples where the prevention of rendering is not conditional on the classification 19A to C of the message 3, rendering of the message 3 is responsive to interaction between the user 7 and the particular external, real object 5 which is determined to be associated with the message 3.

Figure 4A:
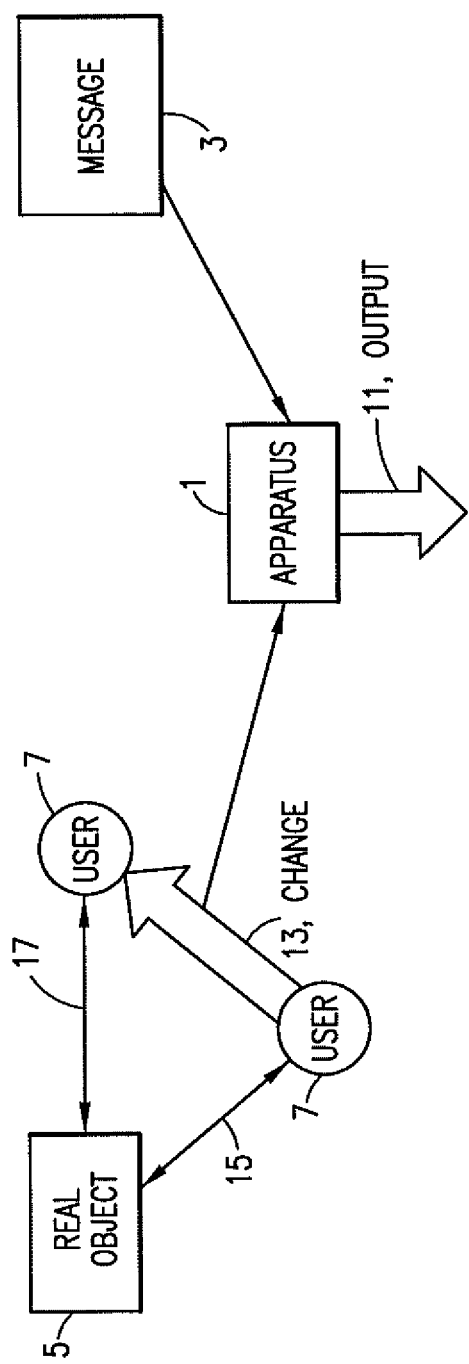
Figure 4B:
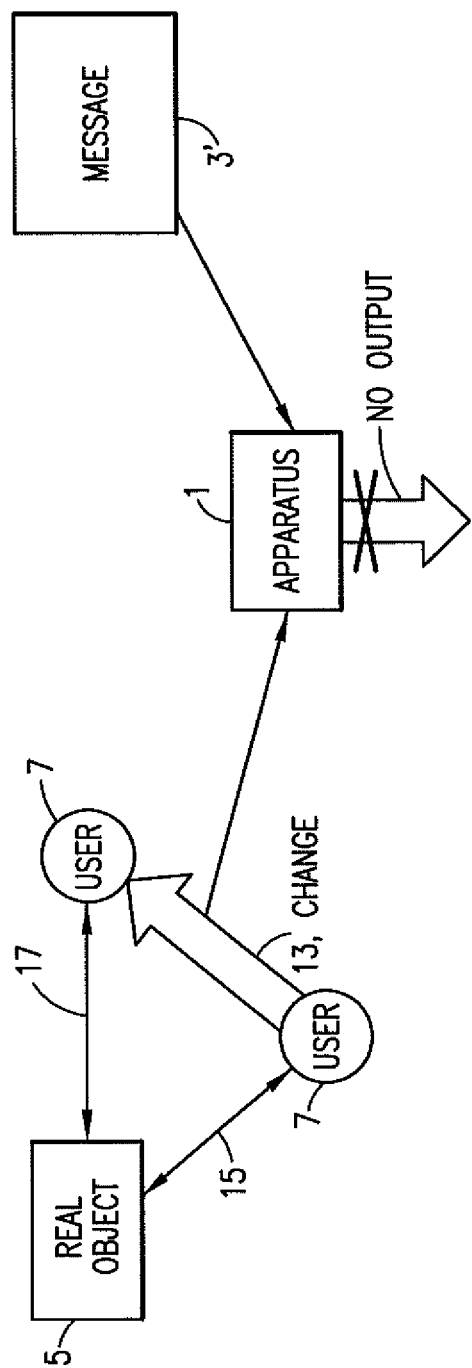

FIGS. 4A and 4B respectively schematically illustrate the outcome, with respect to a first received message 3, of user interaction with the external, real object 5 and the outcome, with respect to a second, different message 3', of the same user interaction with the same external, real object 5.

The first received message 3 is associated with the external, real object 5. The apparatus 1 enables rendering of the first received message 3 in response to the change 13 in the positional relationship between the user 7 and the external, real object 5. In contrast, the second, different received message 3' is not associated with the external, real object 5. The apparatus 1 does not enable rendering of the second, different received message 3' in response to the same change 13 in the positional relationship between the user 7 and the same external, real object 5. The apparatus 1 still prevents rendering of the second, different received message 3'.

In some examples the first received message 3 and the second, different received message 3' have the same content but different context such as, for example, different composers. In other examples, the first received message 3 and the second, different received message 3' have different content but the same context such as, for example, the same composer.

Figure 5:
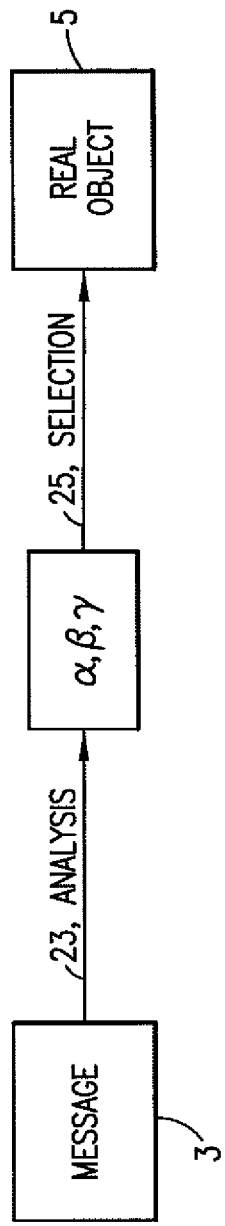

FIG. 5 schematically illustrates how an association 9 between the received message 3 and the external, real object 5 is determined. Determining the association 9 between the received message 3 and the external, real object 5 comprises analysis 23 of the received message 3 to define one or more object parameters $\alpha$, $\beta$, $\gamma$. A selection 25 of an external, real object 5 having the one or more object properties $\alpha$, $\beta$, $\gamma$ then follows.

The analysis 23 of the message 3 comprises analyzing content and/or context of the message 3. In some examples the emotional tone of the message 3 may be determined by analyzing the content of the message 3. The emotional tone may be determined using, for example, natural language processing, artificial intelligence or machine learning algorithms. The determined emotional tone derived from a particular content may differ in respect of different contexts.

Using the determined emotional tone of the message, one or more object properties $\alpha$, $\beta$, $\gamma$ may be defined. These one or more object properties $\alpha$, $\beta$, $\gamma$ may be considered to provide sensations to the user 7 to enhance the emotional tone of the message 3.

In some examples, the one or more object properties $\alpha$, $\beta$, $\gamma$ comprise physical properties of external, real objects 5. Analysis 23 of the received message 3 defines one or more physical properties which are desirable for the external, real object 5, with which the user 7 interacts to enable rendering of the message 3, to possess. For example, analysis 23 of the message 3 may determine that it is desirable for the user 7 to interact with a hot external, real object 5 in order to trigger rendering of the message 3. As a result, the message 3 may be rendered while the user 7 experiences physical warmth.

Evidence of a relationship between physical warmth and emotional warmth, in particular evidence that physical warmth and emotional warmth are, to some extent, substitutable, is provided in, for example, BARGH, J A, and SHALEV, I. The substitutability of physical and social warmth in daily life. *Emotion*, February 2012, Vol. 12(1), pages 154-162. Emotional warmth may comprise interpersonal warmth. For example, exposure to physical warmth may activate concepts or feelings of interpersonal warmth in a person. Interpersonal warmth as perceived by a first person may comprise of traits related to perceived favourability of another person's intentions toward the first person, including friendliness, helpfulness, and trustworthiness. Feelings of interpersonal warmth may also positively affect a first person's behaviour toward others as well. Evidence of a relationship between physical warmth and interpersonal behaviors is provided in, for example, WILLIAMS, L, and BARGH, J. Experiencing Physical Warmth Promotes Interpersonal Warmth. *Science*, 24 Oct. 2008, Vol. 322, Issue 5901, pages 606-607.

Interaction with a hot external, real object 5 may therefore provide a user with emotional warmth (or interpersonal warmth). Also, the physical warmth from the external, real object 5 may simulate, to some extent for a user, the physical warmth of physical contact with another person. The warmth of physical contact can lower heart rate and blood pressure during a stressful experience (see, for example, STORONI, M. Exposure to Heat Can Improve Mental Well-Being. Psychology Today [online], 12 Dec. 2017 [retrieved on Jan. 21, 2018]. Retrieved from <https://www.psychologytoday.com/gb/blog/the-stress-proof-life/201712/exposure-heat-can-improve-mental-well-being>).

Therefore, if, for example, analysis 23 of the received message 3 determines that the user's experience of the message 3 would be enhanced with increased emotional warmth (or interpersonal warmth), a warm temperature may be defined as one of the object properties $\alpha$, $\beta$, $\gamma$.

Evidence that exposure to cool temperatures can increase cognitive control is provided in, for example, HALALI, E, MEIRAN, N, and SHALEV, I. Keep it cool: temperature priming effect on cognitive control. *Psychological Research*, March 2017, Vol. 81, Issue 2, pages 343-354. For example, as described in the aforementioned paper, improved performance in anti-saccade tasks can be can be observed after priming a person with cool temperatures prior to the tasks. Cognitive control is the process by which goals or plans influence behaviour. Also called executive control, this process can inhibit automatic responses and influence working memory. Cognitive control may support flexible, adaptive responses and complex goal-directed thought (Cognitive control. *Nature* [online] [retrieved on Jan. 21, 2018]. Retrieved from <htttps://www.nature.com/subjects/cognitive-control>).

Thus, interaction with a cool external, real object 5 may increase a user's cognitive control. If analysis 23 of the received message 3 determines that the user's experience of the message 3 would be enhanced with increased cognitive control, a cool temperature may be defined as one of the object properties α, β, γ.

Other object properties α, β, γ may be defined based on their association with mood or cognitive enhancements. For example, soft objects may provide a person with feelings of comfort.

The one or more object properties α, β, γ can also or alternatively comprise an association to one or more personal contacts of the user 7. Such an association could be designated by the user 7 or could be learnt from observation of the user's interactions with the external, real object 5.

In some examples the analysis 23 of the received message 3 also determines constraints on which external, real objects 5 can be associated with the received message 3. For example, one constraint may be that the user 7 must historically have a frequency of interaction with the external, real object 5 which exceeds a threshold.

Figure 6:
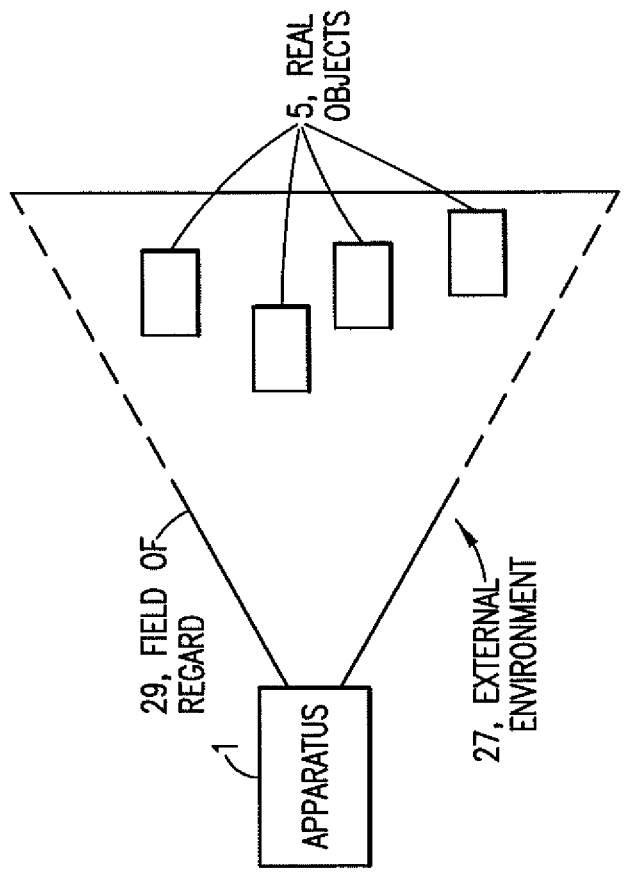

FIG. 6 schematically illustrates an example of how the external, real objects 5 that are available for selection 25 are identified. In this example the apparatus 1 causes analysis of an external environment 27 to identify one or more external, real objects 5 and one or more corresponding object properties α, β, γ. The external environment is a real (as opposed to virtual) environment outside of the apparatus 1. The external environment 27 analyzed by the apparatus 1 may be the area within a field of regard 29 of the apparatus 1 or of any networked or connected sensing devices.

Sensors, whether comprised in the apparatus 1 or in any networked or connected sensing devices may comprise, for example: a camera, a thermal camera, a binaural microphone, etc.

The external environment 27 may be analyzed periodically, when new, unknown objects enter the field of regard 29, or at times which correspond to a known schedule of the user 7 such as, for example, when the user 7 arrives at their desk in the morning.

In some examples the object properties α, β, γ are determined by analysis of the external, real object 5. By way of an illustrative example, the object properties α, β, γ may be determined using a thermal camera (not shown) to detect the temperature of the external, real object 5 such as a coffee mug.

In some examples the object properties α, β, γ are determined by analysis of the immediate surroundings of the external, real object 5. By way of an illustrative example, the object properties α, β, γ may be determined using video processing to recognize steam rising from a coffee mug to thereby infer that the coffee mug is hot.

In some examples the object properties α, β, γ are determined based on observation over time. By way of an illustrative example, if a coffee mug is determined to have been left unattended for a substantial period of time, it can be inferred that the coffee mug is cool.

In some examples the object properties α, β, γ are determined by characteristic actions which the user 7 performs in relation to the external, real object 5. By way of an illustrative example, the object properties α, β, γ may be determined using video processing to recognize that the user 7 is blowing into a coffee mug before sipping from the coffee mug to thereby infer that it is hot.

In other examples the one or more external, real objects 5 are identified from analysis of the external environment 27, however the corresponding object properties α, β, γ are looked-up. The looked-up object properties α, β, γ may be assumed properties of the external, real object 5. Alternatively, the looked-up object properties may be learnt based on the historic interactions between the user 7 and the external, real object 5. By way of an illustrative example, the apparatus 1 may learn that the user 7 routinely brews coffee at certain times during the day to thereby infer that, at around those certain times, any coffee mug proximate to the user 7 is likely to be hot.

In other examples both the external, real objects 5 and the one or more corresponding object properties α, β, γ are looked-up. In these examples, the external, real objects 5 are common objects. Such common objects may be common to the present location of the apparatus 1 such as, for example, objects common to an office space or objects common to a kitchen space.

In some examples the rendering of the message 3 is enabled in response to a predefined change 31 in a physical relationship between the user 7 and the external, real object 5. Examples of a predefined change 31 may include an action made by the user having particular, recognizable characteristics. Such an action may be a particular gesture or particular movement, for example the user raising their arm in a manner characteristic of taking a drink from a mug.

Figure 7A:
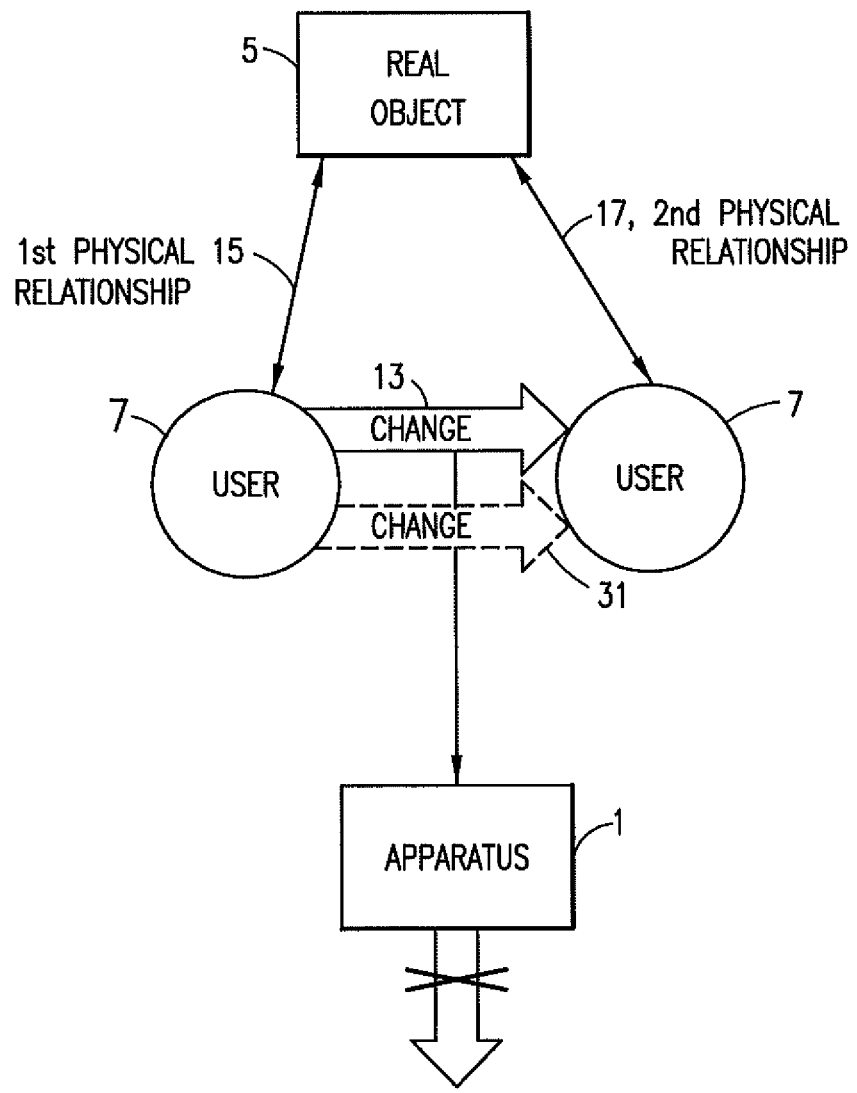
Figure 7B:
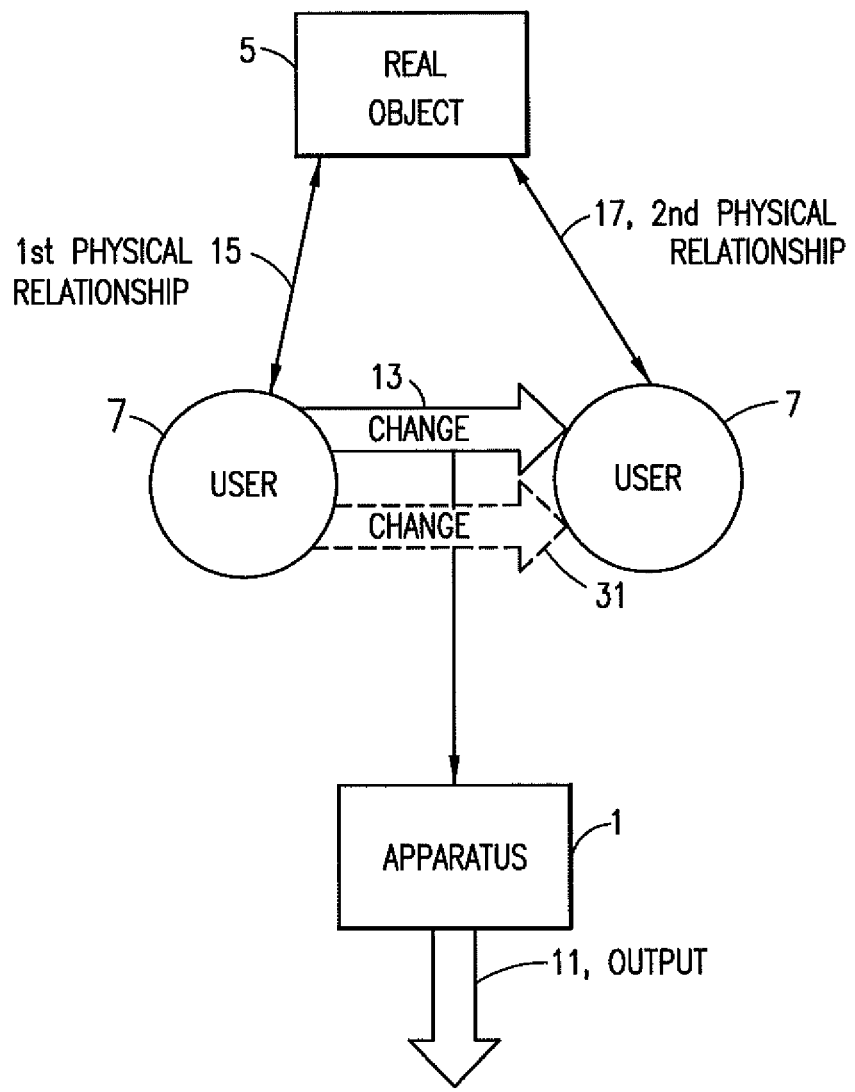

As schematically illustrated in FIG. 7A, when the change 13 from the first physical relationship 15 to the second physical relationship 17 does not match the predetermined change 31, the apparatus 1 does not enable rendering of the message 3. Rendering of the message 3 is still prevented. By contrast, as schematically illustrated in FIG. 7B, when the change 13 from the first physical relationship 15 to the second physical relationship 17 matches the predetermined change 31, the apparatus 1 enables rendering of the message 3.

Determining that the change 13 from the first physical relationship 15 to the second physical relationship 17 matches the predetermined change 31 may comprise determining that this change 13 in the physical relationship is subsequently followed by no further change in the physical relationship between the user 7 and the external, real object 5 for a predetermined period of time. This can reduce errors where the predetermined change 31 occurs serendipitously such as, for example, where the user 7 is passing by the external, real object 5 rather than deliberately approaching it.

In some examples the rendering of the message 3 is enabled in response to a change 13 to a predefined second physical relationship 33. Examples of a predefined second physical relationship 33 may include a predefined proximity of the user 7 to the external, real object 5 and/or may include a predefined orientation of the user 7 relative to the external, real object 5 such as facing the external, real object 7.

Figure 8A:
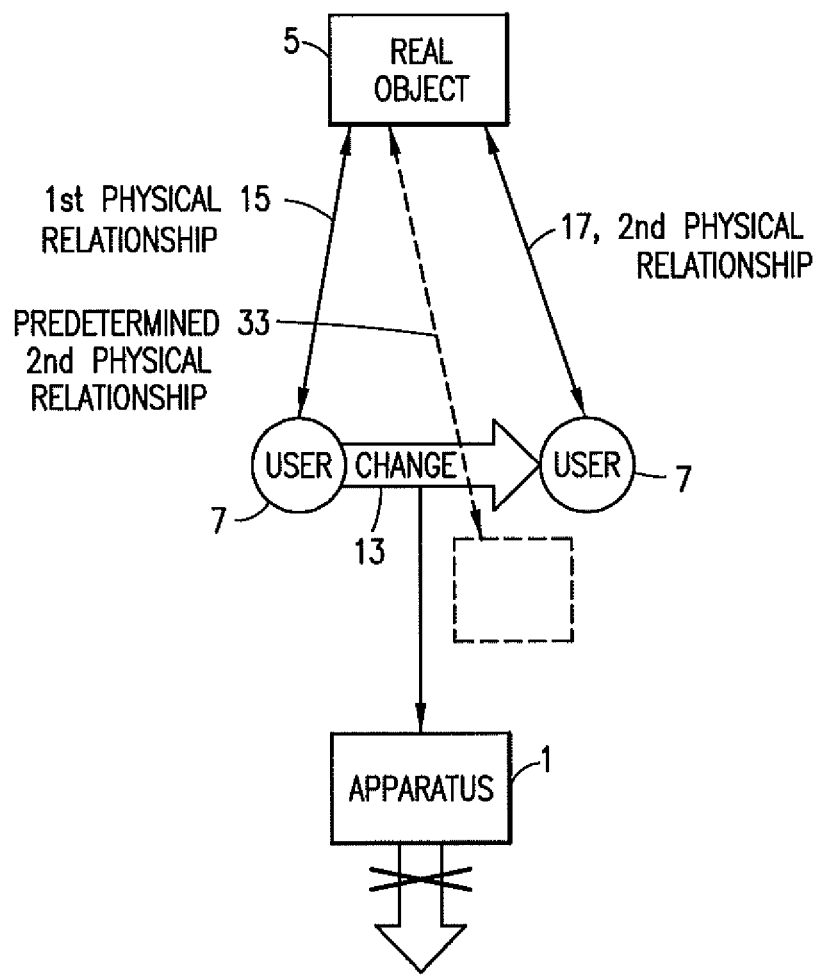
Figure 8B:
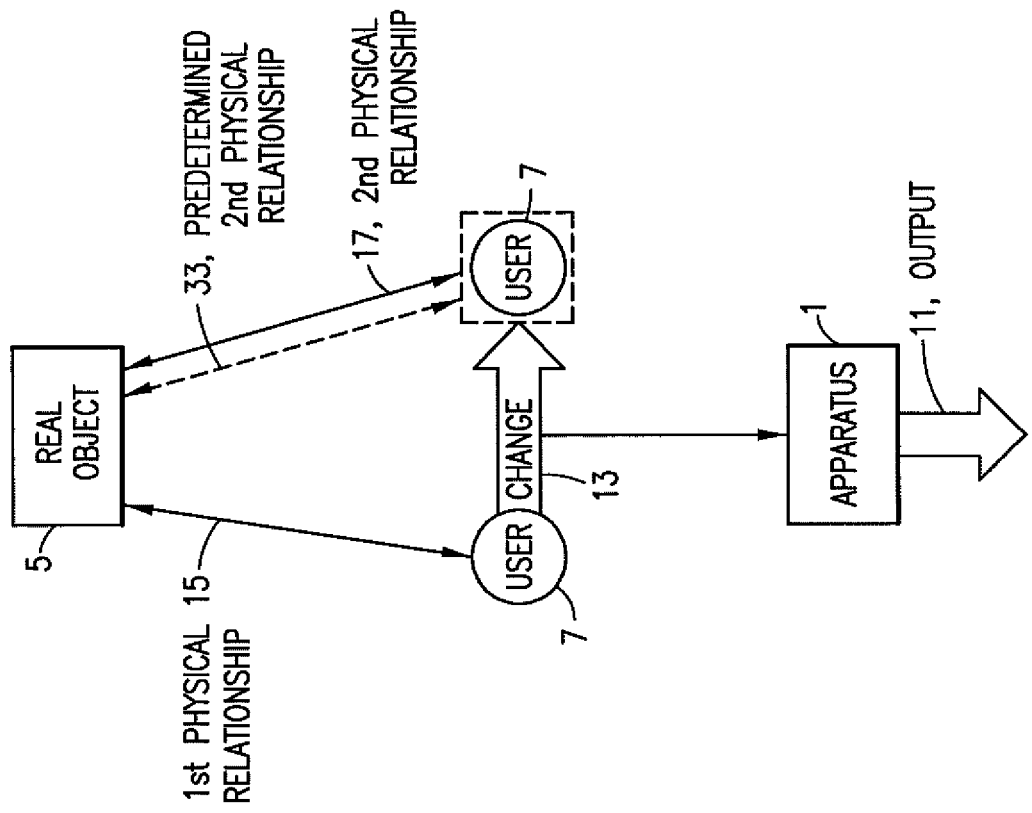

As schematically illustrated in FIG. 8A, when the second physical relationship 17 does not match the predetermined second physical relationship 33, the apparatus 1 does not enable rendering of the message 3. Rendering of the message 3 is still prevented. By contrast, as schematically illustrated in FIG. 8B, when the second physical relationship 17 matches the predetermined second physical relationship 33, the apparatus 1 enables rendering of the message 3.

Enabling rendering of the message 3 may be conditional upon maintenance of the second physical relationship 17 for a predefined period of time. For example, the apparatus 1 may enable rendering of the message 3 when the physical relationship between the user 7 and the external, real object 5 is changed to the predetermined second physical relationship 33 and is maintained in the predetermined second physical relationship 33 for a predefined period of time. If the user 7 and the external, real object 5 do not remain in the predetermined second physical relationship 33 for the predefined period of time, the apparatus 1 does not enable rendering of the message 3.

The rendering of the message 3 may also be enabled in response to a change from a predefined first physical relationship.

The physical relationship between the user 7 and the external, real object 5 can be parameterized into a plurality of parameters which define a parameter space 35 with each dimension 39A, B of the parameter space 35 being represented by one of the plurality of parameters.

Figure 9:
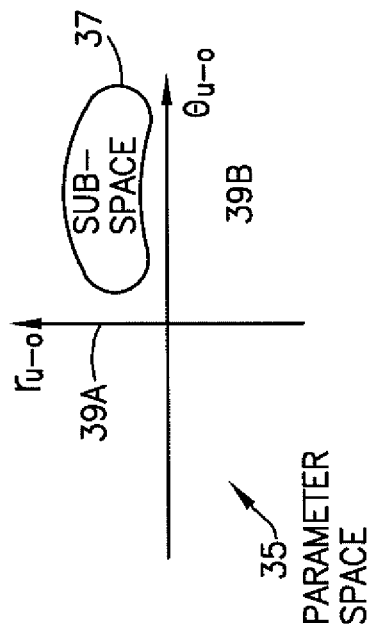

An example of the parameter space 35 is schematically illustrated in FIG. 9.

Figure 10:
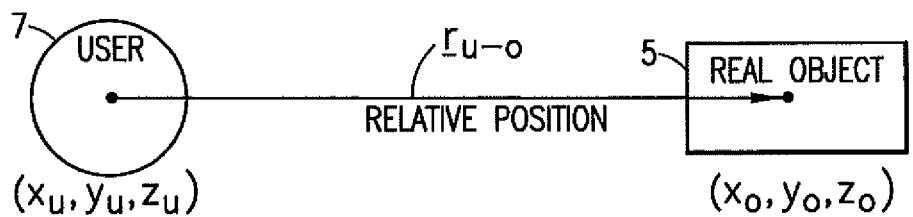

In this example one dimension 39A is represented by a parameter relating to a relative position $r_{u\text{-}o}$ of the user 7 (at position $x_u$, $y_u$, $z_u$) with respect to the external, real object 5 (at position $x_o$, $y_o$, $z_o$), as schematically illustrated in FIG. 10.

Figure 11:
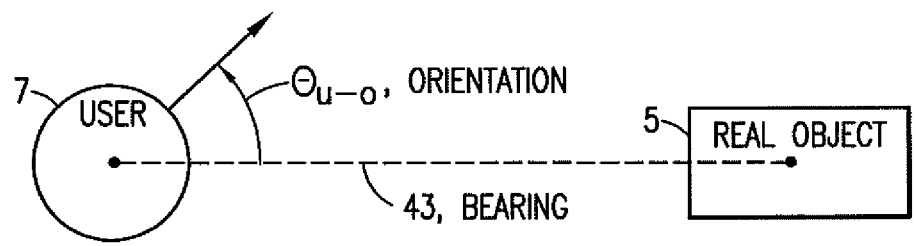

Another dimension 39B of the parameter space 35 of FIG. 9 is represented by a parameter relating to an orientation $\theta_{u\text{-}o}$ of the user 7 with respect to a bearing 43 between the user 7 and the external, real object 5, as schematically illustrated in FIG. 11. This orientation $\theta_{u\text{-}o}$ is determined by the angle between the direction 41 in which the user 7 is facing and the bearing 43 between the user 7 and the external, real object 5. The direction 41 in which the user 7 is facing may be a direction of their gaze or their body.

It is therefore to be appreciated that in some examples the change 13 from the first physical relationship 15 to the second physical relationship 17 comprises a change in at least the relative position $r_{u\text{-}o}$ of the user 7 with respect to the external, real object 5. Also, in some examples the change 13 from the first physical relationship 15 to the second physical relationship 17 comprises a change in at least an orientation $\theta_{u\text{-}o}$ of the user 7 with respect to the bearing 43 between the user 7 and the external, real object 5.

Returning to FIG. 9, a sub-space 37 is defined within the parameter space 35.

In some examples one or more predetermined second physical relationships 33, as described in relation to FIGS. 8A, B above, are defined as such sub-spaces 37 within the parameter space 35.

Second physical relationships 17 that are described by a set of values of parameters which fall within the boundary of a sub-space 37 within the parameter space 35 are determined to match the one or more predetermined second physical relationships 33 and to be indicative of an interaction between the user 7 and the external, real object 5. Accordingly, the apparatus 1 enables rendering of the received message 3.

Second physical relationships 17 that are described by a set of values of parameters which fall outside of the boundary of the sub-space 37 are not considered to be indicative of an interaction between the user 7 and the external, real object 5. Accordingly, the apparatus 1 does not enable rendering of the received message 3. Rendering of the received message 3 is still prevented.

In some examples one or more predetermined changes 31 in a physical relationship between the user 7 and the external, real object 5, as described in relation to FIG. 7A, B above, are defined as such sub-spaces 37 within the parameter space 35.

Changes 13 that are described by a set of values of parameters which fall within the boundary of a sub-space 37 are determined to match the one or more predetermined changes 31 and to be indicative of an interaction between the user 7 and the external, real object 5. Accordingly, the apparatus 1 enables rendering of the received message 3.

Changes 13 that are described by a set of values of parameters which fall outside of the boundary of the sub-space 37 are not considered to be indicative of an interaction between the user 7 and the external, real object 5. Accordingly, the apparatus 1 does not enable rendering of the received message 3. Rendering of the received message 3 is still prevented.

The sub-space 37 within the parameter space 35 may be explicitly defined, either by, for example, default settings or by the user, or may be learnt over time based on the manner in which the user 7 interacts with the external, real object 5 or similar objects.

Figure 12:
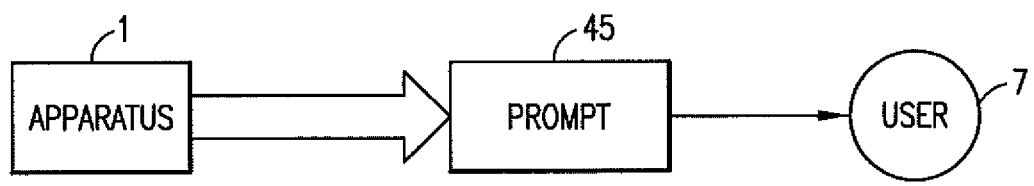

FIG. 12 schematically illustrates an example in which the apparatus 1 causes rendering of a prompt 45 to the user 7. The prompt 45 directs the user 7 to perform the change 13 to the second physical relationship 17.

In some examples the rendering of the prompt 45 is responsive to receipt of the message 3 at the apparatus 1.

In some examples the rendering of the prompt 45 is responsive to a determination that there has been no interaction between the user 7 and the external, real object 5 within a time limit. The time limit may be set according to the classification 19A to C of the message 3. The rendering of the prompt may be responsive to a determination that there has been no change 13 corresponding to the predefined change 31 as described in relation to FIG. 7A, B above within the time limit. The rendering of the prompt 45 may be responsive to a determination that there has been no change to the predefined second physical relationship 33 as described in relation to FIG. 8A, B above within the time limit.

In some examples the rendering of the prompt 45 is responsive to a historic frequency of interaction between the user 7 and the external, real object 5 being below a threshold.

FIG. 13 schematically illustrates a method 50.

The method 50 comprises, at block 52, receiving the message 3 at the apparatus 1 described in relation to FIG. 1 above.

At block 54 of the method 50, rendering of the received message 3 is prevented. In some examples the message 3 is stored instead of being rendered to the user 7.

In some examples, block 54 may be bypassed and the received message 3 rendered following receipt in block 52. This is conditional on the classification 19A to C of the message 3. For example, if the message 3 has a classification reflecting high urgency, preventing rendering of the message as per block 54 may be overridden and the message 3 may be rendered immediately (following determination of the classification 19A to C) to the user 7.

The method 50 further comprises, at block 56, determining the association 9 between the user 7 and the external, real object 5, as described in relation to FIG. 5 above.

In some examples, the association 9 is determined by the analysis 23 of the received message 3 followed by the selection 25 of the external, real object 5. The selection 25 of the particular external, real object 5 which is to be associated with the received message 3 may be made from amongst the external, real objects 5 available for selection.

To identify the external, real objects 5 available for selection, the method 50 may additionally comprise analyzing the external environment 27 to identify one or more external, real objects 5.

Alternatively, the external, real objects 5 available for selection may be looked up. The method 50 may comprise looking up common objects in respect of the current location of the apparatus 1 in order to identify the external, real objects 5 available for selection.

Block 56 may also be omitted if the message 3 is determined to be rendered immediately.

At block 58 of the method 50, rendering of the received message 3 is enabled in response to a change 13 from a first physical relationship 15 between the user 7 and the external, real object 5 to a second physical relationship 17 between the user 7 and the external, real object 5.

In some examples the rendering of the message 3 is enabled in response to the predefined change 31 in a physical relationship between the user 7 and the external, real object 5, as described in relation to FIGS. 7A and 7B above.

In some examples the rendering of the message 3 is enabled in response to a change to the predefined second physical relationship 33, as described in relation to FIGS. 8A and 8B above.

In some examples, block 58 of the method 50 may be preceded by the rendering of a prompt 45 to the user 7, as described in relation to FIG. 12 above.

FIG. 14A illustrates an example of a controller 60. The controller 60 may function as the apparatus 1 or may be comprised within the apparatus 1.

Implementation of the controller 60 may be as controller circuitry. The controller 60 may be implemented in hardware alone, have certain aspects in software including firmware alone or can be a combination of hardware and software (including firmware).

As illustrated in FIG. 14A the controller 60 may be implemented using instructions that enable hardware functionality, for example, by using executable instructions of a computer program 66 in a general-purpose or special-purpose processor 62 that may be stored on a computer readable storage medium (disk, memory etc) to be executed by such a processor 62.

The processor 62 is configured to read from and write to the memory 64. The processor 62 may also comprise an output interface via which data and/or commands are output by the processor 62 and an input interface via which data and/or commands are input to the processor 62.

The memory 64 stores a computer program 66 comprising computer program instructions (computer program code) that controls the operation of the apparatus 1 when loaded into the processor 62. The computer program instructions, of the computer program 66, provide the logic and routines that enables the apparatus to perform the methods illustrated in FIG. 13. The processor 62 by reading the memory 64 is able to load and execute the computer program 66.

The apparatus 1 therefore comprises:
at least one processor 62; and
at least one memory 64 including computer program code
the at least one memory 64 and the computer program code configured to, with the at least one processor 62, cause the apparatus 1 at least to perform:
receiving a message 3 at the apparatus 1;
preventing rendering of the message 3 via the apparatus 1;
determining an association 9 between the received message 3 and an external, real object 5;
enabling rendering of the message 3 via the apparatus 1 in response to a change 13 from a first physical relationship 15 between a user 7 and the external, real object 5 to a second physical relationship 17 between the user 7 and the external, real object 5.

As illustrated in FIG. 14B, the computer program 66 may arrive at the apparatus 1 via any suitable delivery mechanism 68. The delivery mechanism 68 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 66. The delivery mechanism may be a signal configured to reliably transfer the computer program 66. The apparatus 1 may propagate or transmit the computer program 66 as a computer data signal.

Computer program instructions for causing an apparatus to perform at least the following or for performing at least the following:
receiving a message 3 at the apparatus 1;
preventing rendering of the message 3 via the apparatus 1;
determining an association 9 between the received message 3 and an external, real object 5;
enabling rendering of the message 3 via the apparatus 1 in response to a change 13 from a first physical relationship 15 between a user 7 and the external, real object 5 to a second physical relationship 17 between the user 7 and the external, real object 5.

The computer program instructions may be comprised in a computer program, a non-transitory computer readable medium, a computer program product, a machine readable medium. In some but not necessarily all examples, the computer program instructions may be distributed over more than one computer program.

Although the memory 64 is illustrated as a single component/circuitry it may be implemented as one or more separate components/circuitry some or all of which may be integrated/removable and/or may provide permanent/semi-permanent/dynamic/cached storage.

Although the processor 62 is illustrated as a single component/circuitry it may be implemented as one or more separate components/circuitry some or all of which may be integrated/removable. The processor 62 may be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" may refer to one or more or all of the following:
(a) hardware-only circuitry implementations (such as implementations in only analog and/or digital circuitry) and
(b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIG. 13 may represent steps in a method and/or sections of code in the computer program 66. The illustration of a particular order to the blocks does not necessarily imply that there is a required or preferred order for the blocks and the order and arrangement of the block may be varied. Furthermore, it may be possible for some blocks to be omitted.

The apparatus 1 of FIG. 1 may be or may comprise the controller 60 of FIG. 14A or may be any computer or machine capable of reading the computer program 66 from the delivery mechanism 68 of FIG. 14B and running that computer program 66.

FIG. 15 schematically illustrates an electronic communications device 70 comprising the controller 60 of FIG. 14A.

The electronic communications device 70 comprises one or more user interfaces 72 which may be used to render the message 3 and/or the prompt 45.

The electronic communications device 70 also comprises a transceiver 74 for receiving messages 3. In some examples the transceiver 74 may also receive signals from external sensors for monitoring the user 7, the external, real object 5 and/or the physical relationship therebetween. In some examples the transceiver 74 may also receive signals from external sensors for analyzing the external environment 27 to identify the external, real objects 5 that are available for the selection 25.

In some examples, and as schematically illustrated in FIG. 15, the electronic communications device 70 also comprises one or more sensors 76. The one or more sensors 76 are configured to monitoring the user 7, the external, real object 5 and/or the physical relationship therebetween. In some examples the one or more sensors 76 or a different one or more sensors (not shown) comprised in the electronic communications device 70 are configured to analyze the external environment 27 to identify the external, real objects 5 that are available for the selection 25.

The apparatus 1 of FIG. 1 may be or may comprise the device 70 of FIG. 15.

It is to be appreciated that the apparatus 1 may comprise any suitable means for performing the functions hereinbefore described.

Consequently, in some examples, the apparatus 1 comprises means for:

receiving a message 3 at the apparatus 1;
preventing rendering of the message 3 via the apparatus 1;
determining an association 9 between the received message 3 and an external, real object 5;
enabling rendering of the message 3 via the apparatus 1 in response to a change 13 from a first physical relationship 15 between a user 7 and the external, real object 5 to a second physical relationship 17 between the user 7 and the external, real object 5.

Where a structural feature has been described, it may be replaced by means for performing one or more of the functions of the structural feature whether that function or those functions are explicitly or implicitly described.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this description, reference has been made to various examples. The description of features or functions in relation to an example indicates that those features or functions are present in that example. The use of the term "example" or "for example" or "can" or "may" in the text denotes, whether explicitly stated or not, that such features or functions are present in at least the described example, whether described as an example or not, and that they can be, but are not necessarily, present in some of or all other examples. Thus "example", "for example", "can" or "may" refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term "a" or "the" is used in this document with an inclusive not an exclusive meaning. That is any reference to X comprising a/the Y indicates that X may comprise only one Y or may comprise more than one Y unless the context clearly indicates the contrary. If it is intended to use "a" or "the" with an exclusive meaning then it will be made clear in the context. In some circumstances the use of "at least one" or "one or more" may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

I/we claim:

The invention claimed is:

1. An apparatus comprising:
   at least one processor; and
   at least one memory including computer program code, the at least one memory and the computer program code configured to, with the at least one processor, cause the apparatus at least to:
   receive a message at the apparatus; prevent rendering of the message to a user via the apparatus,
   wherein preventing rendering of the message to the user comprises storing the message at the apparatus instead of rendering the message to the user;
   determine an association between the received message and an external, real object; and
   enable rendering of the message to the user via the apparatus in response to a change from a first physical relationship between the user and the external, real object to a second physical relationship between the user and the external, real object.

2. The apparatus as claimed in claim 1 wherein the external, real object is movable.

3. The apparatus as claimed in claim 1 wherein the message is composed at a different apparatus by a user of the different apparatus.

4. The apparatus as claimed in claim 1 wherein preventing rendering of the message to the user is conditional upon a classification of received message.

5. The apparatus as claimed in claim 1 wherein determining the association between the received message and the external, real object comprises: analysis of the received message to define one or more object properties; and selection of an external, real object having at least one of the one or more object properties.

6. The apparatus as claimed in claim 5 wherein the one or more object properties comprise physical properties of the external, real objects.

7. The apparatus as claimed in claim 1 wherein the at least one memory and the computer program code are configured to, with the at least one processor, cause the apparatus to: analyze an external environment to identify one or more external, real objects and one or more corresponding object properties.

8. The apparatus as claimed in claim 1 wherein the rendering of the message to the user is enabled in response to: a predefined change in a physical relationship between the user and the external, real object; and/or a change to a predefined second physical relationship.

9. The apparatus as claimed in claim 1 wherein the change from the first physical relationship to the second physical relationship comprises: a change in at least a relative position of the user with respect to the external, real object; and/or a change in at least an orientation of the user with respect to a bearing between the user and the external, real object.

10. The apparatus as claimed in claim 1 wherein enabling rendering of the message to the user is conditional upon maintenance of the second physical relationship for a predefined period of time.

11. The apparatus as claimed in claim 1 wherein the at least one memory and the computer program code are configured to, with the at least one processor, cause the apparatus to: render a prompt via the apparatus, wherein the prompt directs the user to perform the change to the second physical relationship.

12. The apparatus as claimed in claim 1 wherein the apparatus is an electronic communications device comprising one or more user interfaces and a transceiver for receiving messages.

13. A method comprising:
   receiving a message at an apparatus;
   preventing rendering of the message to a user via the apparatus,
   wherein preventing rendering of the message to the user comprises storing the message at the apparatus instead of rendering the message to the user;
   determining an association between the received message and an external, real object; and
   enabling rendering of the message to the user via the apparatus in response to a change from a first physical relationship between the user and the external, real object to a second physical relationship between the user and the external, real object.

14. The method as claimed in claim 13 wherein preventing rendering of the message to the user is conditional upon a classification of received message.

15. The method as claimed in claim 13 wherein determining the association between the received message and the external, real object comprises:
   analysis of the received message to define one or more object properties; and
   selection of an external, real object having at least one of the one or more object properties.

16. The method as claimed in claim 13 further comprising rendering a prompt via the apparatus, wherein the prompt directs the user to perform the change to the second physical relationship.

17. The non-transitory computer readable medium comprising program instructions stored thereon for performing at least the following:
   prevent rendering, via an apparatus, of a message to a user received at the apparatus; determine an association between the received message and an external, real object,
   wherein preventing rendering of the message to the user comprises storing the message at the apparatus instead of rendering the message to the user; and
   enable rendering of the message to the user via the apparatus in response to a change from a first physical relationship between the user and the external, real object to a second physical relationship between the user and the external, real object.

18. The non-transitory computer readable medium of claim 17 wherein the instructions are further configured to perform: preventing rendering of the message to the user is conditional upon a classification of received message.

19. The non-transitory computer readable medium of claim 17 wherein determining the association between the received message and the external, real object comprises: analysis of the received message to define one or more object properties; and selection of an external, real object having at least one of the one or more object properties.

* * * * *